United States Patent [19]

Shekel

[11] 3,800,218
[45] Mar. 26, 1974

[54] R. F. IMPEDANCE BRIDGE FOR MEASURING REFLECTION COEFFICIENT

[75] Inventor: Jacob Shekel, Philadelphia, Pa.

[73] Assignee: Jerrold Electronics Corporation, Philadelphia, Pa.

[22] Filed: Feb. 7, 1973

[21] Appl. No.: 330,275

[52] U.S. Cl. ......... 324/57 R, 325/58 B, 324/DIG. 1
[51] Int. Cl. ............................................. G01r 27/00
[58] Field of Search ........... 324/58 B, 58.5 B, 57 R, 324/DIG. 1

[56] References Cited
UNITED STATES PATENTS
3,384,887   5/1968   Trimble ...................... 324/58 B X
3,479,587   11/1969   MacKenzie et al. ............ 324/58 B Primary Examiner—Stanley T. Krawczewicz
Attorney, Agent, or Firm—Sandoe, Hopgood & Calimafde

[57] ABSTRACT

A bridge for measuring the reflection coefficient of a two-terminal load, in which the insertion loss between an input port and an output port is proportional to the reflection coefficient of the load connected to a third port, and the constant of proportionality is substantially independent of frequency; includes a balun, a first two-terminal network connected in one arm of the bridge, a second two-terminal network connected in the opposite arm of the bridge, and a resistance equal to the reference resistance in the arm opposite the port to which the load is connected. The impedance of the second network is the inverse, relative to the reference resistance, of the parallel combination of the first network and the additional impedance to ground caused by the connection of the balun.

8 Claims, 6 Drawing Figures

PATENTED MAR 26 1974 3,800,218

R. F. IMPEDANCE BRIDGE FOR MEASURING REFLECTION COEFFICIENT

The present invention relates generally to measuring bridges, and more particularly to an improved r.f. impedance bridge for measuring the reflection coefficient of a two-terminal network, two-terminal impedance, one-port, or the like, over a wide range of frequencies.

The reflection coefficient of a two-terminal network is basically defined when the network is used as a terminating load to a uniform transmission line. In a transmission line terminated in an impedance that is different from its characteristic impedance, a portion of the incident voltage applied to the input end of the line will be reflected from the terminated end of the line. The reflection coefficient of the terminating load is defined as the ratio of the reflected voltage to the incident voltage.

A knowledge of the reflection coefficient of the load is useful to the engineer and technician primarily as a valuable aid in determining the normalized impedance of the load such as in the manner described in Everett and Tanner, "Communications Engineering," McGraw Hill Book Company, New York 1956, at pages 126–128.

The reflection coefficient of a two-terminal load can be measured in ways other than by observing the reflections on a transmission line. The performances of some of these other reflection coefficient measurement techniques result in simpler instrumentation and enhanced precision.

The use of a bridge circuit to measure the reflection coefficient of a network is known. In the conventional measurement bridge, a generator is applied to a first port and a receiver or detector is connected to a second port, and the load whose reflection coefficient is to be measured is connected to a third port. The circuit of the bridge is such that the transmission between the generator port and the detector port is, in principle, proportional to the reflection coefficient of the load at the third port.

The measurement of the reflection coefficient is complicated by the fact that the ports to which the transmitter and detector are respectively connected have no common terminal, thereby requiring the use of a balun at one of the ports, usually to the port to which the detector is connected. A balun is a network that effects a balanced to unbalanced port transformation.

The required use of the balun increases the loading at the terminals of the port to which it is connected, thereby disturbing the balance of the bridge, reducing the accuracy of the measurement, and imposing a lower limit on the values that can be measured. Furthermore, since the balun impedance is a function of frequency, the errors in measurement and the lower limit are also very frequency dependent.

It is an object of the present invention to provide a bridge for measuring the reflection coefficient of a transmission line with greater accuracy and to much lower values than has heretofore been possible.

It is another object of the invention to provide a reflection coefficient measuring bridge for operation over a wide frequency range in which the accuracy of measurement is substantially independent of frequency.

In the reflection coefficient measuring bridge of the present invention, a balun is connected to the receiver port. A first two-terminal network is connected in one arm of the bridge and to the balun, and a second two-terminal network is connected to another arm of the bridge. The impedance of the second network is the inverse of the impedance of the parallel combination of the first two-terminal network and the impedance to ground of the balun relative to the bridge resistance.

To the accomplishment of the above and to such further objects as may hereinafter appear, the invention relates to reflection coefficient measurement bridge substantially as defined in the appended claims and as described in the following specification taken together with the accompanying drawing, in which:

Figure 1:
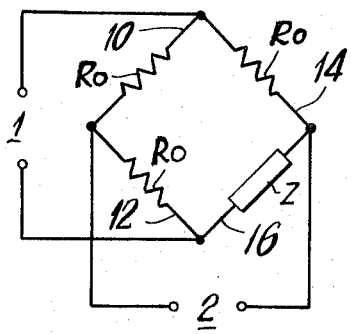
FIG. 1 is a simplified schematic diagram illustrating the principles of a conventional reflection coefficient measuring bridge.

A conventional reflection coefficient measuring bridge circuit, as shown in FIG. 1, consists of a resistance Ro connected in each of arms 10, 12 and 14, and an unknown impedance Z connected in the fourth arm 16. A signal generator (not shown) is connected to input port 1 and a receiver or detector (also not shown) is connected to output port 2. The insertion loss $S_{21}$ of the bridge of FIG. 1 between the generator and receiver ports 1 and 2 is $a/4$ where $$a = Z-Ro/Z+Ro \qquad (1)$$

is the reflection coefficient of the impedance Z relative to the bridge resistance Ro. The reflection coefficient of the unknown impedance Z can thus be determined from a measurement of the insertion loss.

The practical measurement of the reflection coefficient by the use of the conventional bridge of FIG. 1 is, however, complicated by the fact that ports 1 and 2 have no common terminal. As a result, it is necessary to employ a balun at one of these ports to serve as a transition. In the bridge circuit shown in FIG. 2, a balun 18 having a balanced terminal pair and an unbalanced terminal pair is connected to the receiver port 2. As will become more evident from an analysis of FIG. 3, which is an equivalent circuit of the bridge of FIG. 2 in terms of the reflection coefficients of the arms of the bridge, the use of the balun introduces additional loading at the terminals of port 2, that is, a finite impedance to ground which appears in parallel with arm 12, and introduces unavoidable errors in the measurement of the reflection coefficient of the unknown impedance.

Figure 2:
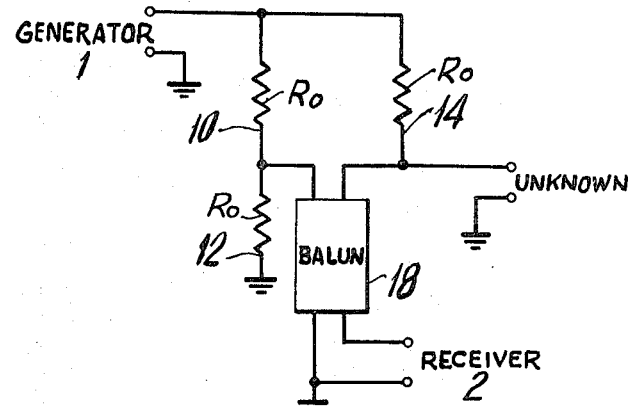
FIG. 2 is a more detailed schematic diagram of a conventional reflection coefficient measuring bridge.
Figure 3:
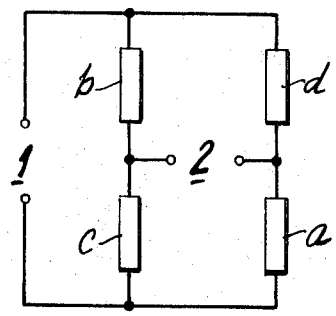
FIG. 3 is an equivalent diagram of the bridge of FIGS. 2 and 4.

In the equivalent circuit of FIG. 3, the elements $a$, $b$, $c$, and $d$ represent the reflection coefficients of the four arms of the bridge. That is, $b$ and $d$ respectively represent the reflection coefficients of the resistances Ro in arms 10 and 14 in the bridge of FIG. 2, and arms 10 and 14a in the bridge of FIG. 4; c represents the reflection coefficient of the balun and the resistance Ro in arm 12 (FIG. 2) or arm 12a (FIG. 4); and a represents the reflection coefficient of the unknown impedance (not shown in FIG. 2 or FIG. 4).

The insertion loss of the circuit of FIG. 3 can be readily determined by known techniques and can be expressed as:

$$S_{21} = [(a+b)(cd+1) - (c+d)(ab+1)]/[4 - (a+b)(c+d)]$$

(2)

If $b = c = d =$ as in the conventional bridge circuit of FIG. 1, equation (2) becomes simply:

$$S_{21} = a/4$$

(3)

In the conventional bridge circuit of FIG. 2, the presence of balun 18 at port 2 causes c to be different than zero, and because of the construction of the balun, c will be unavoidably dependent on frequency. The inclusion of the balun in a conventional measurement bridge, such as that shown in FIG. 2, thus introduces errors into the measurement of the reflection coefficient. If c is not zero, the equation (2) becomes $$S_{21} = a - c/4 - ac$$

(3a)

which indicates that the insertion loss of the bridge is no longer proportional to the reflection coefficient a.

Figure 4:
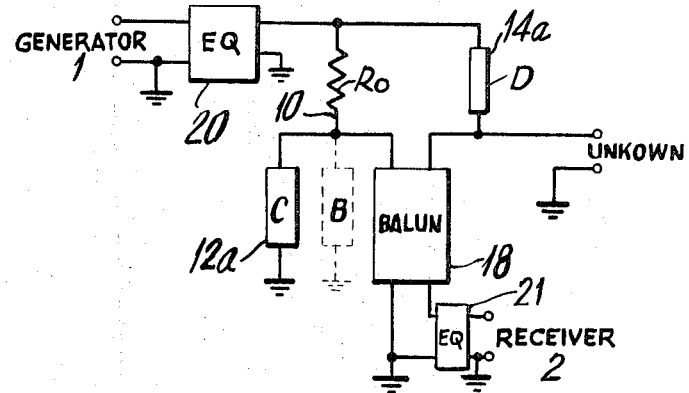
FIG. 4 is a schematic diagram of a reflection coefficient measuring bridge according to an embodiment of the invention.

The reflection coefficient bridge of the invention, as shown in FIG. 4, makes use of a balun to effect the necessary transition as in the conventional bridge, but is of an improved design in which measurement errors, such as those introduced by the balun as in the conventional circuit of FIG. 2, are substantially eliminated.

In the reflection coefficient measurement bridge of the invention, a resistance Ro remains connected in arm 10 of the bridge. The resistance Ro in arm 12 is replaced by a two-terminal impedance network C which, as shown in FIG. 4, is connected to one terminal of balun 18 and is connected in parallel to ground with the impedance to ground introduced by the balun as represented by the equivalent impedance designated B and shown in broken lines in FIG. 4. In addition, the resistance Ro in arm 14 is replaced by a second two-terminal network D. In a significant aspect of the bridge of the invention, the impedance of network D is the inverse of the parallel combination of the impedance B and that of network C, relative to the bridge resistance Ro. If desired, an equalizer network matched at its input and output to resistance Ro is connected to port 1 for reasons to be described in a later portion of the specification.

With reference to the equivalent circuit of FIG. 3, the following conditions are met for the bridge of FIG. 4:

$$b = 0$$

(4)

that is, the reflection coefficient of the resistance Ro in arm 10 is zero. For the inverse impedance relation described above for network D with respect to that of network C and the balun:

$$c+d = 0$$

(5)

Substituting the relations expressed in equations (4) and (5) into the general equation of equation (2), we obtain:

$$S_{21} = ka, \text{ where } k = 1-d^2/4;$$

(6)

where a is the reflection coefficient of the unknown impedance. The insertion loss of the bridge is thus proportional to the reflection coefficient a.

Thus, in the reflection coefficient measurement bridge of the invention, the reflection coefficient being tested (a in equation (6)), is related to the insertion loss of the bridge by the factor k, which significantly is independent of a, but which may under some circumstances be a function of frequency. To compensate for this possible frequency dependency of k, an equalizer matched at its input and output to Ro may be connected to the generator port, or to the receiver port, or to both the generator and receiver ports as shown by equalizer 20 and 21 in FIG. 4. The design of such an equalizer is believed to be well known to those skilled in the art and is thus not further described herein.

Figure 5:
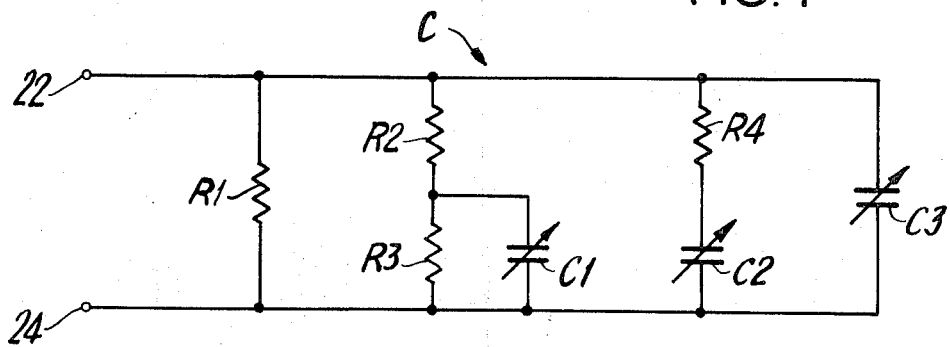
FIG. 5 is a more detailed schematic diagram of one of the networks of the bridge of FIG. 4.

FIG. 5 is a detailed schematic of a network that has been employed as network C in the bridge of the invention for a bridge resistance Ro of 75 ohms. As shown, network C includes a pair of terminals 22 and 24 across which a resistor R1 is connected. Connected in parallel to resistor R1 is a resistor R2 in series connection with a resistor R3 connected in parallel with a capacitor C1. Also connected in parallel with resistor R1 is a resistor R4 in series connection with a capacitor C2, and a capacitance C3. The capacitors C1, C2, and C3 are shown as being variable in FIG. 5. The values of these capacitors are fixed during the construction of the bridge to achieve optimum results and remain fixed thereafter.

Figure 6:
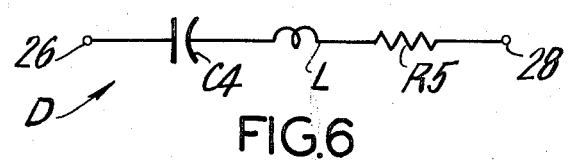
FIG. 6 is a more detailed schematic diagram of another of the networks of the bridge of FIG. 4.

Network D, according to the embodiment thereof illustrated in FIG. 6, includes terminals 26 and 28 between which a capacitor C4, an inductance L, and a resistor R5 are in series connection.

For a 75-ohm bridge the components of networks C and D may have the following values, which are given only for purposes of example and are not intended to limit the scope of the invention.

R1 = 25 ohms
R2 = 390 ohms
R3 = 33 ohms
R4 = 820 ohms
R5 = 249 ohms
C1 = 15–60 pf.
C2 = 5–35 pf. ½
C3 = .7–3 pf.
C4 = .0043 f.
L = 2 turns No. 28 wire The balun 18 employed in an embodiment of the reflection coefficient measurement bridge of the invention consisted of 6½ turns of RG-179B, (75-ohm small coaxial cable) wound on a toroid ferrite core. that It will thus be appreciated, particularly from equation (6), that the reflection coefficient measurement bridge of the invention is capable of providing an accurate measurement of the reflection coefficient of an impedance or network over a wide range of frequencies. Significantly, the accuracy of that measurement is substantially independent of frequency. In a bridge employing the networks C and D illustrated in FIGS. 5 and 6, the accuracy of measurement performed over a range of frequencies between 2 and 500 mHz was sufficiently independent of frequency such that no equalizer such as that shown in FIG. 4 was required.

In the operation of the bridge of the invention, the network or impedance under test is placed in one arm of the bridge and a test signal is applied across the generator port. The insertion loss between ports 1 and 2 of the bridge is then determined in a known manner, and the reflection coefficient $a$ of the impedance under test may then be readily computed from equation (6), since $k$, which is a function only of $d$, the known reflection coefficient of network D, is known.

Although the bridge of the present invention has been herein specifically described with respect to a single embodiment, it will be apparent that modifications, such as in the design of networks C and D, may be made without necessarily departing from the spirit and scope of the invention.

What is claimed is:

1. A bridge for measuring the reflection coefficient of a two-terminal load relative to a characteristic impedance $Ro$, said bridge having a first terminal for connection to said load, a second terminal for connection to a generator, a third terminal for connection to a receiver or a measuring device, a fourth terminal for connection to the respective ground terminals of said load, generator and receiver or measuring device, a fifth terminal, a resistance of value $Ro$ being connected between said second terminal and said fifth terminal, a first two-terminal network being connected between said fifth terminal and said fourth terminal, a second two-terminal network being connected between said first terminal and said second terminal, a balun having a balanced terminal pair and an unbalanced terminal pair, said balanced terminal pair being connected between said first terminal and said fifth terminal of said bridge, said unbalanced terminal pair being connected between said third terminal and said fourth terminal of said bridge, said second network having an impedance which is substantially equal to the inverse, with respect to $Ro$, of the parallel combination of said first network and the effective load presented by said balun between said fifth terminal of said bridge and ground.

2. The bridge of claim 1, wherein said balun comprises a section of coaxial cable wound on a ferrite core.

3. The bridge according to claim 1, further comprising an equalizer matched at its input and output to $Ro$ connected between said second terminal and said generator.

4. The bridge according to claim 3, further comprising a second equalizer matched at its input and output to $Ro$ connected between said third terminal and said receiver or measuring device.

5. The bridge according to claim 1, further comprising an equalizer matched at its input and output to $Ro$ connected between said third terminal and said receiver or measuring device.

6. The bridge according to claim 2, further comprising an equalizer matched at its input and output to $Ro$ connected between said second terminal and said generator.

7. The bridge according to claim 6, further comprising a second equalizer matched at its input and output to $Ro$ connected between said third terminal and said receiver or measuring device.

8. The bridge according to claim 2, further comprising an equalizer matched at its input and output to $Ro$ connected between said third terminal and said receiver or measuring device.

* * * * *